(12) United States Patent
Foygel et al.

(10) Patent No.: US 8,583,705 B2
(45) Date of Patent: Nov. 12, 2013

(54) AUTOMATIC DOCUMENT EXCHANGE AND EXECUTION MANAGEMENT

(75) Inventors: Dan A. Foygel, Oakland, CA (US); Jason M. Lemkin, Los Altos, CA (US); Jeffrey M. Zwelling, Hillsborough, CA (US)

(73) Assignee: Adobe Systems Incorporated, San Jose, CA (US)

( * ) Notice: Subject to any disclaimer, the term of this patent is extended or adjusted under 35 U.S.C. 154(b) by 480 days.

(21) Appl. No.: 12/829,781

(22) Filed: Jul. 2, 2010

(65) Prior Publication Data

US 2010/0274863 A1 Oct. 28, 2010

Related U.S. Application Data

(63) Continuation of application No. 11/652,371, filed on Jan. 11, 2007, now Pat. No. 7,996,439.

(60) Provisional application No. 60/760,222, filed on Jan. 18, 2006.

(51) Int. Cl.
*G06F 17/30* (2006.01)

(52) U.S. Cl.
USPC ........... 707/804; 707/636; 707/770; 713/155; 713/183; 709/206

(58) Field of Classification Search
USPC .................. 707/636, 770, 804; 713/155, 183; 709/206
See application file for complete search history.

(56) References Cited

U.S. PATENT DOCUMENTS

| | | |
|---|---|---|
| 5,008,853 A | 4/1991 | Bly et al. |
| 5,465,299 A | 11/1995 | Matsumoto et al. |
| 5,606,609 A | 2/1997 | Houser et al. |
| 5,615,268 A | 3/1997 | Bisbee et al. |
| 5,671,428 A | 9/1997 | Muranaga et al. |
| 5,748,738 A | 5/1998 | Bisbee et al. |
| 5,790,790 A | 8/1998 | Smith et al. |
| 5,832,499 A | 11/1998 | Gustman |
| 5,910,987 A | 6/1999 | Ginter et al. |
| 5,987,429 A | 11/1999 | Maritzen et al. |

(Continued)

FOREIGN PATENT DOCUMENTS

| | | |
|---|---|---|
| WO | 96/41463 A1 | 12/1996 |
| WO | WO 01/99388 A3 | 12/2001 |
| WO | WO03009200 A1 | 1/2003 |

OTHER PUBLICATIONS

Alok Gupta et al. "Digital Signature: use and modification to achieve success in next generation e-business processes", ACM, Digital Library, vol. 41, ussue 5, May 2004, p. 1 of 1.*

(Continued)

*Primary Examiner* — Debbie Le
(74) *Attorney, Agent, or Firm* — Kilpatrick Townsend & Stockton LLP (57) ABSTRACT

The exchange of documents for signature can be performed efficiently using an automatic routing system that associates a document with appropriate identifying metadata. The routing can be facilitated through facsimile in which the metadata is encoded on a return facsimile cover sheet that is routed with the document. Appropriate central exchange servers have appropriate input and out subsystems to perform the document routing. The executed documents can be conveniently archived for efficient document storage and access, such as network access to one or more of the parties.

20 Claims, 7 Drawing Sheets

(56) References Cited

U.S. PATENT DOCUMENTS

| | | | |
|---|---|---|---|
| 6,021,202 | A | 2/2000 | Anderson et al. |
| 6,039,248 | A | 3/2000 | Park et al. |
| 6,049,787 | A | 4/2000 | Takahashi et al. |
| 6,061,448 | A | 5/2000 | Smith et al. |
| 6,067,513 | A | 5/2000 | Ishimitsu |
| 6,085,322 | A | 7/2000 | Romney et al. |
| 6,105,012 | A | 8/2000 | Chang et al. |
| 6,141,753 | A | 10/2000 | Zhao et al. |
| 6,185,563 | B1 | 2/2001 | Hino |
| 6,199,052 | B1 | 3/2001 | Mitty et al. |
| 6,202,056 | B1 | 3/2001 | Nuttall |
| 6,219,423 | B1 | 4/2001 | Davis |
| 6,237,096 | B1 | 5/2001 | Bisbee et al. |
| 6,253,322 | B1 | 6/2001 | Susaki et al. |
| 6,260,145 | B1 | 7/2001 | Komura et al. |
| 6,289,460 | B1 | 9/2001 | Hajmiragha |
| 6,314,517 | B1 | 11/2001 | Moses et al. |
| 6,327,611 | B1 | 12/2001 | Everingham |
| 6,367,013 | B1 | 4/2002 | Bisbee et al. |
| 6,452,691 | B1 | 9/2002 | Marshall |
| 6,470,448 | B1 | 10/2002 | Kuroda et al. |
| 6,516,328 | B1 | 2/2003 | Mori et al. |
| 6,584,466 | B1 | 6/2003 | Serbinis et al. |
| 6,587,945 | B1 | 7/2003 | Pasieka |
| 6,622,162 | B2 | 9/2003 | Kawasaki et al. |
| 6,625,642 | B1 | 9/2003 | Naylor et al. |
| 6,671,805 | B1 | 12/2003 | Brown et al. |
| 6,678,705 | B1 | 1/2004 | Berchtold et al. |
| 6,694,315 | B1 | 2/2004 | Grow |
| 6,757,826 | B1 | 6/2004 | Paltenghe |
| 6,851,053 | B1 | 2/2005 | Liles et al. |
| 6,898,707 | B1 | 5/2005 | Sit et al. |
| 6,925,182 | B1 | 8/2005 | Epstein |
| 6,944,648 | B2 | 9/2005 | Cochran et al. |
| 6,959,382 | B1 | 10/2005 | Kinnis et al. |
| 6,963,971 | B1 | 11/2005 | Bush et al. |
| 6,990,504 | B2 | 1/2006 | Powell et al. |
| 7,031,004 | B1 * | 4/2006 | Hayward et al. ............. 358/1.15 |
| 7,146,343 | B2 | 12/2006 | Donahue |
| 7,243,127 | B2 | 7/2007 | Tabayoyon, Jr. et al. |
| 7,254,588 | B2 | 8/2007 | Sung et al. |
| 7,302,674 | B1 | 11/2007 | Gladieux et al. |
| 7,360,079 | B2 * | 4/2008 | Wall ............... 713/155 |
| 7,373,365 | B2 | 5/2008 | Varadarajan et al. |
| 7,437,421 | B2 | 10/2008 | Bhogal et al. |
| 7,587,369 | B2 | 9/2009 | Ginter et al. |
| 7,596,511 | B2 | 9/2009 | Hall et al. |
| 7,685,013 | B2 | 3/2010 | Gendler |
| 7,707,153 | B1 | 4/2010 | Petito et al. |
| 7,720,729 | B2 | 5/2010 | Wilce et al. |
| 7,788,485 | B2 * | 8/2010 | Connell ........................ 713/157 |
| 7,925,584 | B2 | 4/2011 | Allin et al. |
| 7,931,098 | B2 | 4/2011 | Aronstam et al. |
| 7,934,098 | B1 | 4/2011 | Hahn et al. |
| 2002/0002563 | A1 | 1/2002 | Bendik |
| 2002/0059144 | A1 | 5/2002 | Meffert et al. |
| 2002/0129056 | A1 | 9/2002 | Conant et al. |
| 2003/0033241 | A1 | 2/2003 | Harari |
| 2003/0037261 | A1 | 2/2003 | Meffert et al. |
| 2003/0056100 | A1 | 3/2003 | Beatson |
| 2003/0140010 | A1 | 7/2003 | Patterson et al. |
| 2003/0216932 | A1 | 11/2003 | Foley |
| 2003/0220879 | A1 | 11/2003 | Gaughan et al. |
| 2004/0078337 | A1 | 4/2004 | King et al. |
| 2004/0088340 | A1 | 5/2004 | Idicula et al. |
| 2004/0225884 | A1 | 11/2004 | Lorenzini et al. |
| 2005/0022198 | A1 | 1/2005 | Olapurath et al. |
| 2005/0055306 | A1 * | 3/2005 | Miller et al. ................... 705/37 |
| 2005/0094192 | A1 | 5/2005 | Harris et al. |
| 2005/0132195 | A1 | 6/2005 | Dietl |
| 2005/0203785 | A1 | 9/2005 | Kixmiller |
| 2006/0036934 | A1 | 2/2006 | Fujiwara |
| 2006/0069926 | A1 | 3/2006 | Ginter et al. |
| 2006/0095777 | A1 | 5/2006 | Brekke et al. |
| 2006/0277123 | A1 | 12/2006 | Kennedy et al. |
| 2007/0078771 | A1 | 4/2007 | Allin et al. |
| 2007/0083554 | A1 | 4/2007 | Crume et al. |
| 2008/0097777 | A1 | 4/2008 | Rielo |
| 2008/0147790 | A1 | 6/2008 | Malaney et al. |
| 2009/0021796 | A1 | 1/2009 | Bloomfield |

OTHER PUBLICATIONS

Non Final Office Action in Related U.S. Appl. No. 13/004,507, dated Nov. 10, 2011, 8 pages.

Final Office Action in Related U.S. Appl. No. 13/004,507, dated Aug. 26, 2012, 9 pages.

Non Final Office Action in Related U.S. Appl. No. 13/179,284, dated Oct. 1, 2012, 29 pages.

Non Final Office Action in Related U.S. Appl. No. 13/004,507, dated Jan. 25, 2013, 10 pages.

* cited by examiner

AUTOMATIC DOCUMENT EXCHANGE AND EXECUTION MANAGEMENT

CROSS REFERENCE TO RELATED APPLICATION

This application is a continuation of copending U.S. patent application Ser. No. 11/652,371 to Foygel et al., filed on Jan. 11, 2007, entitled "Automatic Document Exchange and Execution Management," which has issued as U.S. Pat. No. 7,996,439, and claims priority to U.S. provisional patent application Ser. No. 60/760,222 filed on Jan. 18, 2006 to Zwelling et al., entitled "Document Exchange, Interaction and Archiving Facilitated by the Internet," the contents which are incorporated herein by reference.

FIELD OF THE INVENTION

The invention relates to improved automated approaches to document handling relating to execution of agreements, contracts and the like. In particular, the automatic exchange of documents can be performed through fax machines, over the Internet or other network or a combination thereof. Suitable hardware and software for implementing these automated procedures are described.

BACKGROUND OF THE INVENTION

The growth of the information age has placed ever greater demands on most people's time and organizational abilities. There are growing amounts of information that needs to be managed in a reasonable way. At the same time, the information age has made it possible to send information at fast rates over essentially any relevant distance. This information is generally transmitted over extensive optical and/or electrical wire networks which may also interface with wireless radio communication, satellite relay, microwave communication or similar wireless communication channels. These communication channels tie into conventional phone lines or Internet based computer networks. The format of the signal can be adjusted with correspondingly appropriate electrical, optical or other routing information such that telecommunication equipment can direct the information to the appropriate portals.

While fax machines and email provide very rapid and efficient mechanisms for the transfer of information, they do not inherently organize the vast amounts of information transmitted over these channels. In carrying out business relationships, documents are exchanged for signature. While modern document delivery channels provide for rapid document exchange, much of the corresponding efficiencies may be lost by the need to manually organize and track the document distribution.

SUMMARY OF THE INVENTION

In a first aspect, the invention pertains to a method for exchanging documents for execution. The method comprises the step of routing a document automatically for signature along with identifying metadata associated with the document at a remote physical or electronic location. Also, the method comprises tracking the return of the executed document. The invention further pertains to storage media comprising instructions for the performance of these methods as well as computer systems for implementing these methods.

In a further aspect, the invention pertains to a central exchange server comprising an input subsystem, a processor and an output subsystem. The input subsystem comprises data connections to external addresses for the input of data. The processor is programmed to associate metadata with a document received through the input subsystem based on routing information. The output subsystem comprises data connections to external addresses for the output of data. The processor generally is programmed to automatically route the document based on the routing information.

In additional aspects, the invention pertains to a method for electronic management of documents. The method comprises automatically archiving a document following apparent execution of the document by some or all of a plurality of requested parties following automatic routing to the requested parties. The archived documents are available through a network for access by the requesting party or by one or more additional parties.

DETAILED DESCRIPTION OF THE INVENTION

Efficiencies of document execution and storage can be greatly enhanced through an automated system that inputs routing information and the document for execution and then routes the document of execution until requested signatures are obtained. This process can be combined with archiving of the executed document for later reference. Execution of a document refers to obtaining signatures, and the "signatures" can be electronic or physical signatures. To obtain physical signatures, the system can interface with a facsimile document output and/or input, although scanned documents can be input by way of email or other network directed interface. To perform the routing, the document can be associated with metadata that uniquely identifies the document. Appropriate computing systems can be used to implement the document management services. These computer systems are interfaced with appropriate input and output channels as well as an internet interface.

The documents can be contracts, purchase orders, confidentiality agreements, leases, deeds, receipts, bills of sale letters of engagement, or other legal or commercial documents. Alternatively, the documents can be documents where an approval, rather than a formal legal signature, is desired, such as an approval of a change order, insertion order or work instructions. Execution of the document refers to obtaining signatures on the document of approval. A particular document may invite one, two, three or more signatures.

The document handling system generally automates a document execution process through the intake of the document and routing instructions, routing of the document and the presentation of the executed document. This exchange can be performed within a secured environment. The exchange of documents and/or instructions can be directed electronically through the Internet or a combination of the Internet and facsimile formatted documents over the phone lines or the Internet. In particular, routing instructions are generally input through the Internet at a web page and document transfer can take place either over the internet or over fax connections. To maintain this flexibility for document transfer, the system generally maintains connections both through the Internet and through phone lines for facsimile transmitting and receiving.

The system is able to intelligently route documents through the association of a document with metadata, which is provided generally by one or more parties associated with the documents. Metadata in the context of the world-wide-web has become associated with directing information used to guide a browser to websites or web service of interest. These have been described as data-about-data or information-about-information that provides a labeling, cataloging or descriptive function. As used herein, the term metadata is used in an even broader sense as cataloging/labeling information that identifies a document and related information across media such as in a printed format or an electronic format. Also, the metadata is only decodable by the system such that the metadata is not for general use by others using the same data channels. In some embodiments, the metadata has different formats depending on whether or not it is an electronic format or physical format.

The terms Internet and World-Wide-Web should be given broad scope. Specifically, these should include the existing international computer networks that provide email and website or web service access broadly to individuals that have addressed the network as well as any future manifestations of a broadly accessible computer network. These networks can comprise electrically wired, optical, wireless satellite, wireless microwave, wireless radio communication channels that interconnect users. Suitable networks include also private networks.

To accomplish the objectives with desired levels of flexibility, the system generally comprises one or more central server(s) with a core computer(s) connected to a suitable database. The database contains and/or is associated with, a storage system. The core interfaces with one or more input channels and output channels. The input channel and output channel each have an interface with the world-wide-web or other email or data transmission network and in some embodiments a fax transmission connection. The core computer also can have an interface with a web server that provides for an exchange with a user connected through a web page or other internet connection. Initial instructions for initiating a transaction can be input from a website or web service which prompts a user for all of the appropriate information to control the transaction, although the input can be entered in alternative mechanisms, including web services and web interfaces, among others.

A particular transaction is initiated through the receipt of a service order. The service order provides instructions for carrying out a transaction including appropriate routing information. For security and billing purposes, the user-originator generally enters a user name and password or other identifying information to associate the originator with identifying information known to the system. The originator can be a person or a computer.

The document for the transaction can be input through a post to a web site, a direct or indirect interface with a web server or web service, an email message or a fax according to the instructions in the service order. In either case, metadata for identifying the document are generated, and a request for the document is forwarded appropriately to the originator. The originator then forwards the document with the associated metadata to the central server. The document and metadata are then forwarded either sequentially or in parallel to the signatories according to the instructions. The signed documents are received and verified. This process is repeated until the signatory instructions have been satisfied or rejected. Then, the originator and other appropriate individuals are notified that the transaction is completed and the completed document is provided to appropriate individuals through selected channels, such as a facsimile or secure website or web service. In addition, interim status updates can be made available and may be provided for transactions which are incomplete and/or partially complete.

Of course, the system is designed generally to facilitate a plurality of transaction both simultaneously and sequentially. Another dimension of the system capabilities involves the archiving and organization of the executed documents from the transactions. In particular, the documents can be organized on a web page in groupings involving the originator as well as with other selected identifiers. Varying degrees of organization can be selected for facilitating the archiving and execution of documents with specific formatting available to a user.

System for Implementing Document Exchange

In general, the system to implement the processes described herein comprises one or more central server(s) (which may be in multiple locations, and distinct from one another) with one or more processors connected to suitable storage devices with interfaces to appropriate input and output subsystems. In some embodiments, the input and output subsystems each comprise both a gateway to the internet and a fax connection to the phone system. These connections provide optional document transmission/receipt as a facsimile document, a browser download or other web-based document acquisition, an internet-based notification or as an email document attachment. In addition, the central server can be connected to the internet such that it can function as a web server, or the central server can be interfaced with a web server and/or web service. While a variety of configurations can be used to assemble the appropriate hardware and software, the common features described herein provide the desired functionality.

The central server can be one computer or a group of interfaced computers that may or may not be at the same physical location. In general, the computers can be commercially available computers such as personal computers, servers, main frame computers and the like, such as future renditions of these computers. The input subsystem and output subsystem generally comprise suitable hardware to interface with the respective data channels, and may comprise a processor(s) for file manipulation and/or routing. The data channels can comprise one or more pathways that are presently available or may become available in the future, such as wire connections, optical communication channels, radio channels, microwave channels and the like. The initially received data may or may not then undergo a conversion of format. The conversion of format can be performed by the central server or processors associated with the communication subsystems. In some embodiments, documents are converted to a common format, such as PDF format, for further processing. The web or other network interfaces can also use conventional technology or may be based on future technologies.

Figure 1:
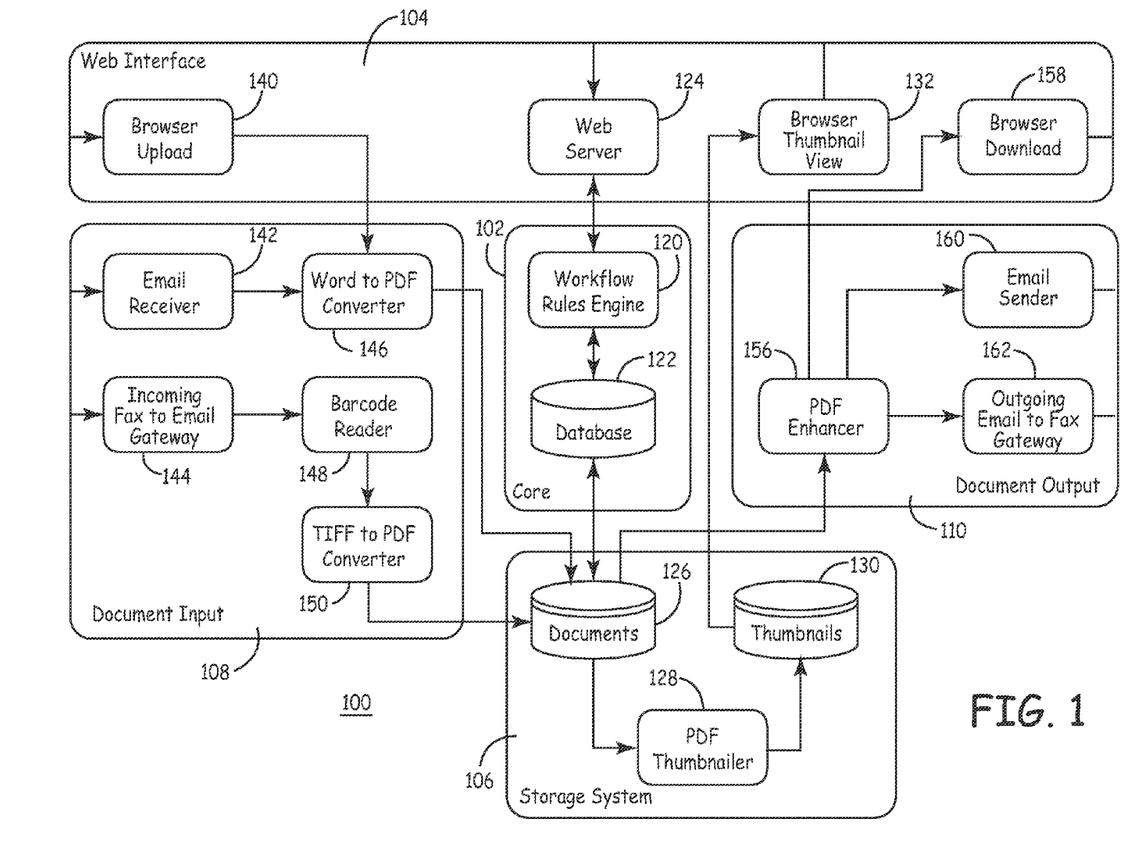
FIG. 1 is a schematic view of an embodiment of a system for agreement management.

One representative configuration for the system is shown in FIG. 1. As shown in FIG. 1, document system 100 comprises core or central server 102, web interface 104, storage system 106, input subsystem 108 and output subsystem 110. The components may interface with each other through a common system bus and/or through a network, through USB, firewire and/or appropriate connections presently available or developed in the future.

Core 102 comprises a computer or a distributed network of interfaced computers that runs software that executes a workflow rules engine 120. Workflow rules engine 120 controls the flow of the processing of documents by the system as well as the archiving process, although these two functions can be handled by distinct software units. Workflow rules engine 120 interfaces with a database 122 on a suitable nonvolatile storage medium, such as a magnetic drive, optical drive or the like. In this embodiment, database 122 stores the status of documents being processed as well as the rules for providing access to archived documents.

Core 102 is interfaced with web interface 104 and storage system 106. Specifically, in this embodiment, core 102 interfaces with a web server 124. In some embodiments, the computer(s) of core 102 can be the web server itself, or the web server 124 can be a separate computer or distributed network of computers. The web server generally provides a website or a web or other application interface at which a document originator requests signature of a document and inputs instructions for handling a particular document.

Storage system 106 comprises nonvolatile storage such as a hard drive for storage of documents 126. Storage system 106 can further comprise a processor that runs software that performs document imaging and/or PDF conversion 128. A range of commercially available software can perform the function of generating images, such as Product Scope 32 Pro™ from Encourager Software or MD2 Thumbnailer 1.0. The thumbnail images 130 can be stored for quick access to authorized individuals to view archived documents. Specifically, thumbnail images 130 can be made available, for example, through a browser thumbnail view 132 or the like. Storage system 106 can be interfaced with input channel 108 and output channel 110.

In this embodiment, input subsystem 108 has three gateways for receiving documents, a browser upload 140, an email receiver 142 and an incoming fax gateway 144. Fax gateway 144 can comprise a conventional fax modem or other suitable device for receiving and/or transmitting signals over a phone line. Browser upload 140 receives a file through a website portal, which can include a web or other application interface. Email receiver 142 receives the file as an attachment to an email message. Incoming fax gateway receives the message over a phone line in facsimile format that may correspond with a particular TIFF format. Input from browser upload 140 or email receiver 142 are checked for format and converted to PDF format, such as from MSWord™ format, if necessary, which can be performed with a PDF converter 146, such as Adobe Acrobat™. An incoming fax can be reviewed with a barcode reader 148 which can identify a bar code on an image file, such as DTK Barcode Reader SDK v 3.0, which can identify several barcode formats, or Barcode Tools from Softek Software. After reading the barcode, the TIFF facsimile file can be converted to a PDF file with a TIFF to PDF converter 150, such as Adobe Acrobat™. Regardless of the gateway through which the document was received, a PDF version of the document along with corresponding metadata can be forwarded to storage system 106 so that core 102 can evaluate the further routing of the document.

In this embodiment, output channel 108 receives documents from storage system 106 and has a connection to three output gateways. Documents from storage system 106 can be processed by a PDF enhancer 156. "PDF Enhancer" is available from Apago Inc., and similar software is available from other vendors. A dedicated computer for the output channel 108 can run the PDF enhancer, or the core computer(s) and/or a processor associated with the storage system 106 can execute the PDF enhancer routine. The enhanced PDF file can then be routed to browser download 158, email sender 160 that send the file as an email attachment, or outgoing email to fax gateway 162, which can be a fax modem or the like.

A person of ordinary skill in the art will recognize that this representative configuration is subject to a range of suitable variations that depend on convenience for a particular environment. For example, instead of or in addition to a PDF format, other formats can be used, such as JPEG, BMP, PNG, GIF and others.

A user generally would be able to communicate through web connections with a conventional web browser or other internet connection with any appropriate connection generally through to an internet service provider. Similarly, for facsimile transmissions, a commercial fax modem or the like can be used to provide the transmissions. While any reasonable communication protocols can be used for the communications, although standard protocols provide ready compatibility. Fax protocols are generally established by International Telephone Union Telecommunication Standardization Sector (ITU-T), Group 3 for communication over Public Switched Telephone Network (PSTW).

Electronic mail communications similarly have standard protocols, although non-standard protocols can be used if appropriately coordinated. Typically, the Simple Mail transfer Protocol (SMTP) within the TCP/IP (Transmission Control Protocol/Internet Protocol) suite of protocols is used by routers connected to the network. Fax protocols and internet mail protocols are described further in U.S. Pat. No. 6,625,642 to Naylor et al., entitled "System and Process for Transmitting Electronic Mail Using a Conventional Facsimile Device," incorporated herein by reference.

File transfer mediated through a web browser can be performed with File Transfer Protocol (FTP), HTTP or other suitable protocol. The web browser authorizes the file transfer from the originating computer. The central server can associate the transferred file with the corresponding metadata. In addition, transfer may be done via the use of web services and web interfaces, such as an API.

Document Handling Procedures

Figure 2:
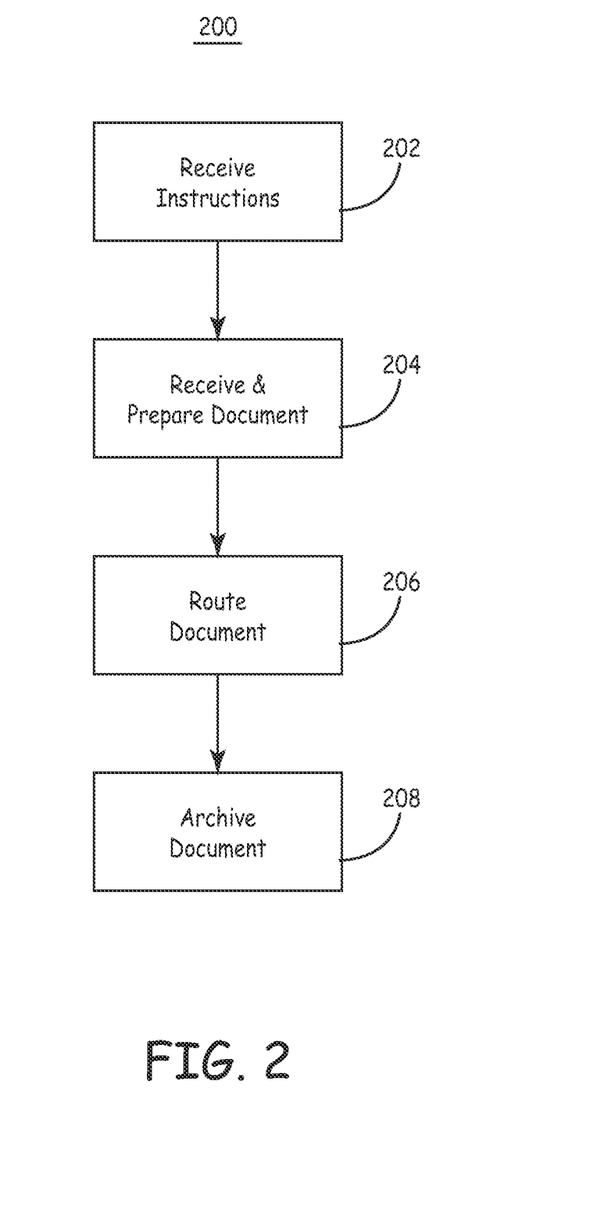
FIG. 2 is a flow diagram an embodiment of the steps for management of agreement execution.

The automated procedure described herein for a transaction relating to handling document execution provides an efficient and flexible approach for document handling that is compatible over a range of technologies. In particular, these procedures are extremely efficient at obtaining physical signatures while being flexible to handle electronic signatures as these become acceptable in a broader range of circumstances. Referring a flow diagram in FIG. 2, a representative embodiment of a document execution transaction 200 can generally be considered as comprising four steps. Specifically, transaction 200 comprises receiving instructions 202, receiving and preparing the document 204, routing document for execution 206 and archiving document 208. This diagram depicts the life cycle of document execution through the automated process described herein. Each of these steps generally has a plurality of associated sub-processes, and all aspects of these steps may or may not be done in sequence such that there may be overlap with respect to aspects of the main steps.

Figure 3:
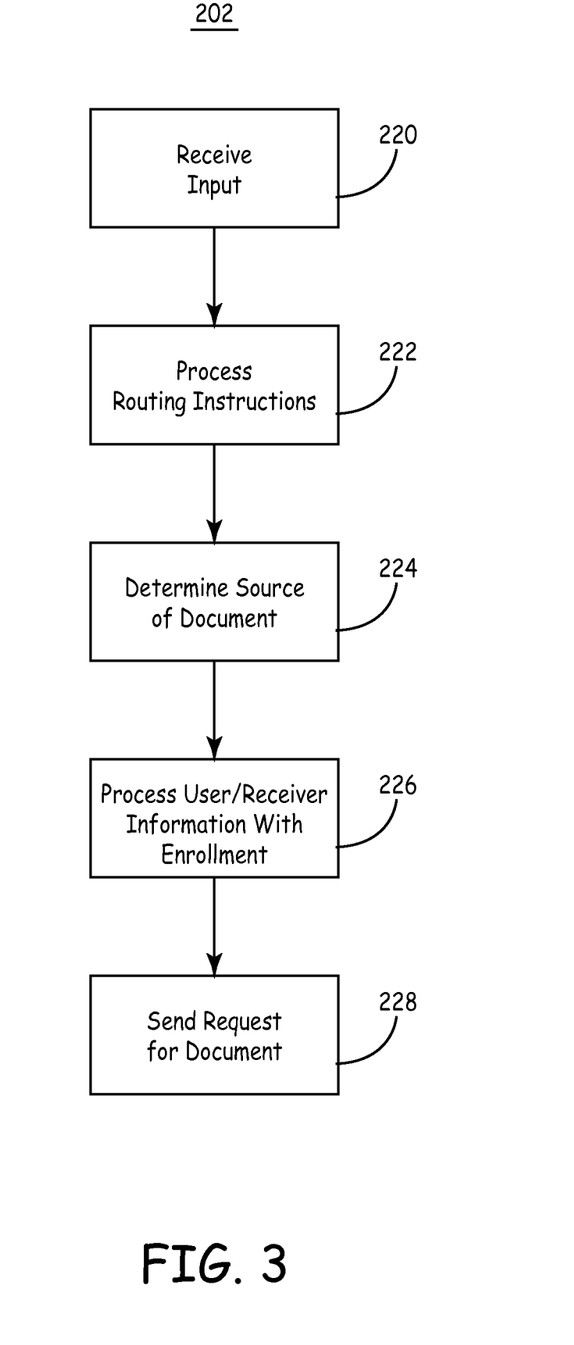
FIG. 3 is a flow diagram depicting an embodiment of the steps related to receiving instructions for agreement handling.

One embodiment of the process to receive instructions 202 is depicted in FIG. 3. Input is received 220 regarding routing instructions and identification of the originating party. Generally, the input is received by way of a web page through a web browser connected to the internet or other appropriate networking portal. However, information can be initiated through other means, such as written instructions or the like, which can be transcribed into the system to initiate the automated processing.

The routing instructions are processed 222 to determine the number of signatures requested, the identity of the signatory (ies), the delivery approach for each signature, the contact information of a signatory, and the requested order of signatures, if more than one signature is requested. The input is also examined with respect to a determination of the source of the document 224.

For security purposes as well as for billing purposes, the transaction originator logs into the system for identification purposes. The login information is processed 226 to identify the user within the system. Generally, security is ensured through unique identification of a user. The unique identification can be provided with a user name and password or other suitable identification procedure. A particular signatory does not necessarily need to have a registered login for the system, but an invitation to be a logged-in member generally can be made to provide the full archive capability of the system, which cannot generally be provided for security purposes unless the person is a login member.

System accounts can be organized into groups of users. For example, a larger company can have a group of individual users. Similarly, larger groups of users can be organized into subgroups. The user organization into groups and optionally into subgroups can be related to various functionalities of the system. For example, particular members of a group/subgroup can have access to a particular group of archived documents and/or to particular form documents. In general, a group manager is established with the group organization to approve addition or removal of individuals from a group or subgroup. The group manager has authority to change group account information and access within the system.

Using the information on the source of the document, a request is sent for the document 228. If the document is to be received by way of the web server following receipt of the order instructions, the user is prompted to attach the document. If the document is to be received by fax, in some embodiments, a fax is sent with a return cover sheet to the document originator, and/or in other embodiments with physical markings on the document. The return fax sheet and/or physical markings can have a barcode representing the metadata to identify the document. A barcode is intended to broadly refer to any image that can represent the metadata so that electronic reading of the image can provide the associated metadata. If the document is to be received by email, a solicitation email can be sent to the originating person or computer. The soliciting email generally can contain a representation of the metadata so that the returned document attached to the reply email can be associated readily with the metadata. In addition, in some cases the metadata can be associated via optical character recognition (OCR) of some or all of the underlying document, which can then be matched to a database of potential documents to associate with the incoming document. OCR can be performed with commercial software, such as NUANCE™, SOFTSCAN™ or ABBYY™.

Figure 4:
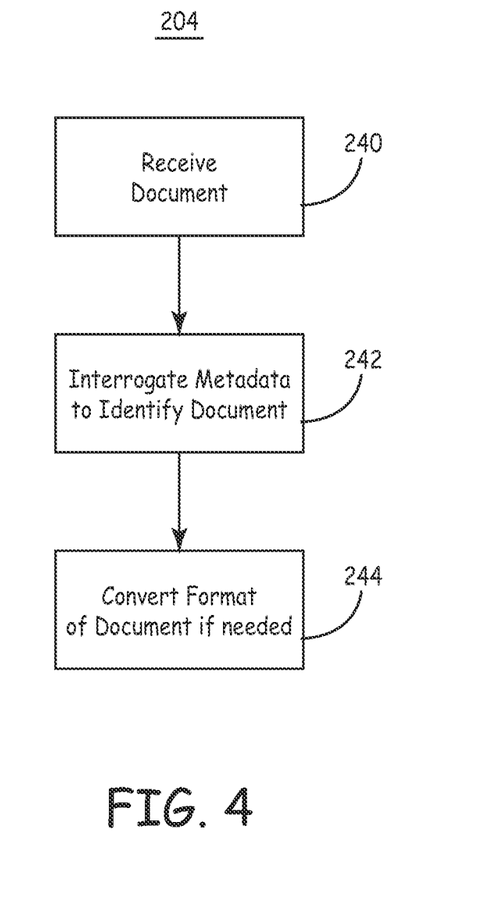
FIG. 4 is a flow diagram depicting an embodiment of the steps related to receiving and preparing documents for routing.

The receipt and preparation of the document 204 comprises receiving the document 240 based on the request for the document 228. The request for the document 228 initiates a process to receive the document with associated metadata. Following receipt of the document with metadata, the metadata can then be interrogated 242 to identify the document with a particular routing protocol. In general, if the document is received in a word processor format, such as WordPerfect™ or Microsoft-WORD™, the document is generally converted to one or more document or image formats. A PDF format can be used since it is relatively compact with respect to file size and is generally readable by most users, although other formats, such as TIFF formats, can be used if desired. To simplify the discussion, it will be assumed that a PDF format is used. Similarly, if the document is received as a TIFF format, such as by fax or by email, the file can be converted to a PDF format. Thus, regardless of the format of the source document, the document can be converted to a common format 244, if appropriate.

Alternatively, the originator may use a standardized form provided by the system instead of a separate form attached, faxed, e-mailed by the user. The system can be configured to offer one or more forms for particular purposes, such as purchase orders, service orders or the like. In some embodiments, the system can provide an editing function to fill in specific numbers on the form, or the system can pose specific queries to obtain numbers that the system automatically places into the document. In addition, in some embodiments, individual users or user groups can store documents on the system for later use by the individual user or individual users within a user group.

Figure 5:
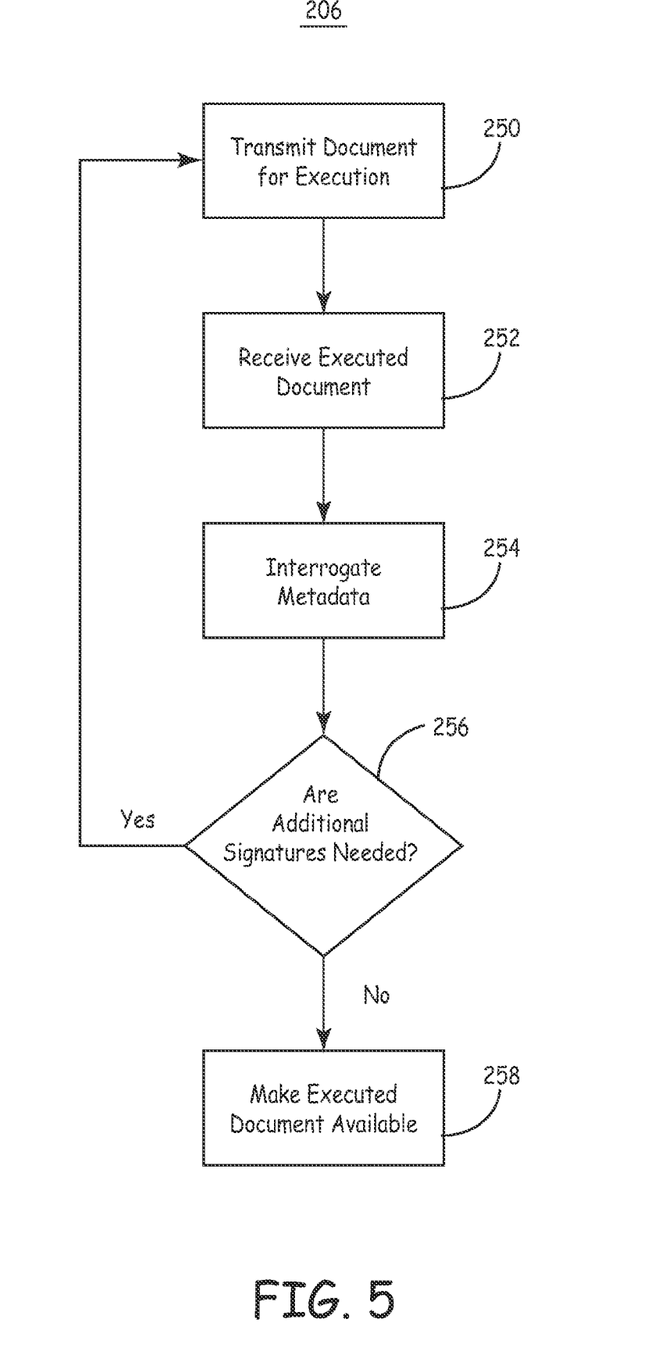
FIG. 5 is a flow diagram depicting an embodiment of the steps related to routing an agreement for execution.

Once converted to a common format if appropriate, the document is routed for execution 206. Based on the routing information, the document is transmitted 250 to the first signatory. The transmitted document is associated with metadata. If the document for execution is sent by way of facsimile, the metadata can be in the form of a bar code on the return fax cover sheet sent to the signatory with the document. For documents send by email for signature, the metadata can be embedded in the subject ("Re:") line or other convenient location in the message such that it would be available in a reply message.

The executed document is received from the signatory 252. In general, the document may or may not be returned through the same route that it was sent. For example, if the document was sent by fax, it can be returned by email, and if it was sent by email, it can be returned by facsimile. Appropriate instructions can be sent for alternative return routes to associate the metadata with the document. The returned document can be converted to PDF format if needed. The signature associated with the returned document can be a physical signature that is converted to an image format with the remainder of the document, or an electronic signature in a suitable format, such as one compliant with the E-SIGN Act of 2000.

The metadata associated with the returned document is interrogated 254 to associate the document with a particular routing protocol. The routing protocol is then reviewed to determine if additional signatures are requested 256. If the routing protocol calls for additional signatures, the document with the signatures to date is transmitted again to the new signatory or signatories 250, and the process of receiving the executed document is repeated.

Once all of the signatures have been obtained according to the routing protocol, the document is made available 258 to the parties. This can be performed in one or more ways. For example, the signed document can be faxed to all of the parties. Also, the signed document can be emailed to all of the parties. In addition, the signed document can be made available through a website and/or via access through web services, such as an API. A combination of one or more of these approaches can be used. The approach through a website can be combined with an archival process.

Figure 6:
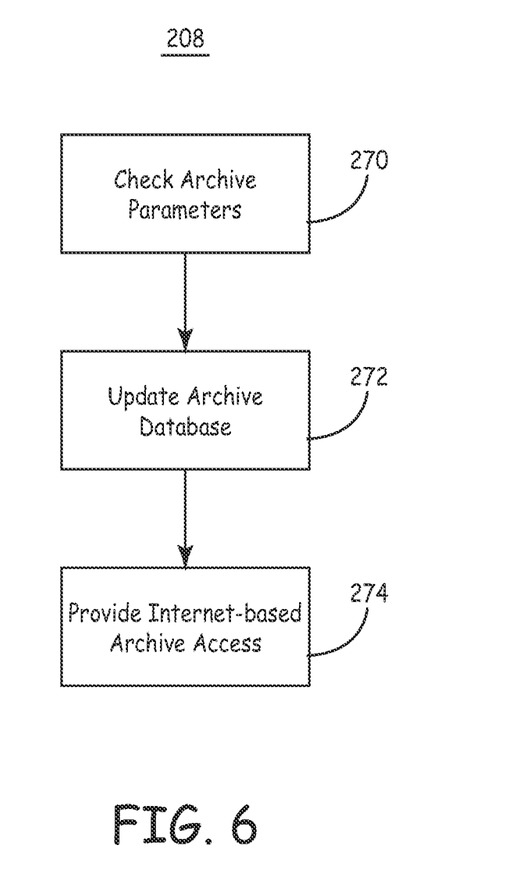
FIG. 6 is a flow diagram depicting an embodiment of the steps related to archiving an executed agreement.

The archiving of the document 208 comprises the organization of an executed document within a database such that a plurality of documents can be accessed if security precautions are satisfied. Referring to FIG. 6, a representative embodiment of the archiving of an executed document is depicted with particular steps. In general, the document routing information contains information regarding the archiving of the document following execution of the document. These archival parameters are checked 270. Based on the archival parameters, the archive database is updated 272. This update of the archive database generally comprises storage of the executed document as well as the storage of the document access information. Using the updated archive data, the system generally provides access to the documents in the archive appropriately based on selected organization parameters and authentication of security information to provide access 274.

While the processes shown above are described in a linear fashion, for a particular user, the system can provide more sophisticated agreement management approaches with a visual organization that facilitates use of the system. A wide range of embodiments can be implemented to facilitate agreement management. One embodiment is depicted in FIG. 7.

Figure 7:
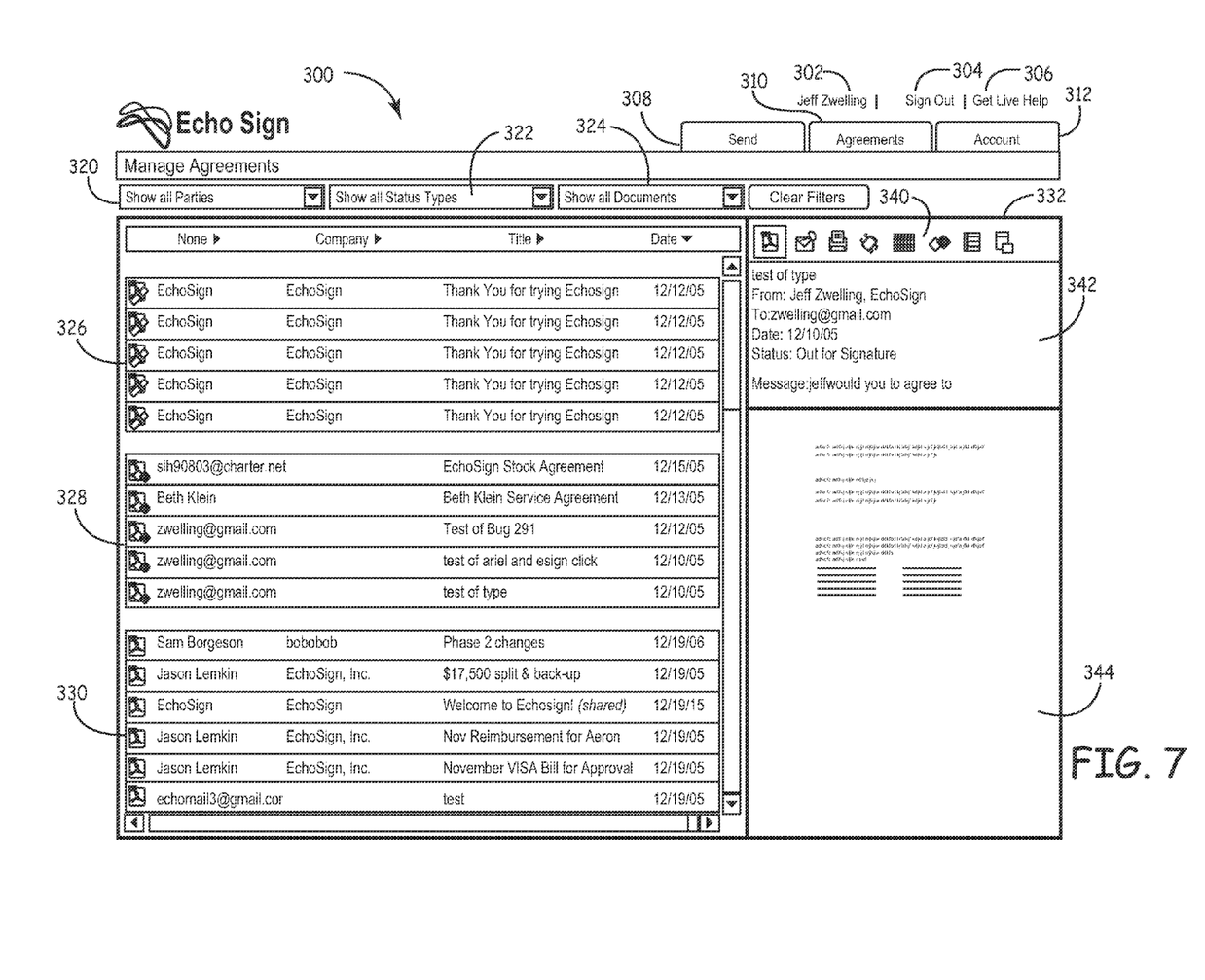
FIG. 7 is an image of a web page useful for the management of agreements entered into the agreement management system.

FIG. 7 depicts a web page screen 300. In this embodiment, general login information is depicted at the top, including user name 302, logout command 304 and help command 306. Three tabs 308, 310, 312 provide selection of a screen format, respectively, for performing the input of instructions to initiate document transaction, for viewing the status of agreements and for reviewing account information, such as balances outstanding. The agreements page format is depicted over most of the page in FIG. 7.

With respect to the agreements page format, pull down menus 320, 322, 324 provide for the selection of the format for the agreement listings. The selections in the embodiment of FIG. 7 provide for viewing lists with all parties or only selected parties, with all status types or only selected status types and all document types or only selected document types. Thus, the agreements can be associated with a label to indicate its type. As depicted in FIG. 7, the document list is divided into groupings for a list of documents waiting for execution by the user 326, a list of user's documents awaiting signature by a third party 328 and a list of completed documents 330.

In this embodiment, clicking on a document within lists 326, 328, 330 provided a summary relating to the document in block 332. Summary block 332 comprises a one click command line 340 to manipulate the selected agreement, a summary of document parameters 342 and a view of the first page of the document 344. While this embodiment has one particular page layout, a person of ordinary skill in the art can select page layouts with different esthetic qualities and different information, as desired.

While the procedures described above relate generally with a process to execute documents, the archiving and document handling capabilities can be adapted for the archiving and communication of documents that are fully executed prior to introduction into the procedure. While these approaches do not require the full capabilities of the system, the system still provides significant efficiencies with respect to document transfer, maintenance and storage. For example, a signed standard purchase order, which has been signed by a purchaser, can be forwarded into the system. The signed purchase order can be archived with access to the seller so that the purchase order can be picked up. Similarly, a document with multiple signatures can be archived following execution to organize the documents for the convenience of one or more parties. The system above can be adapted to accommodate fully executed documents. Furthermore, the system can easily accommodate a mixture of documents in which certain documents need routing for signature while other documents received in completed form are archived and/or directed to a receiving party. In addition, the system can accommodate documents in which a written or electronic approval, rather than a legal signature, is instead required.

The agreement processing procedures are generally intended to be carried out automatically by the processors integrated into the system without human intervention. While in normal operation the processes are performed automatically, it will be understood that human intervention can be used on occasion, for example, to overcome problems identified, to address concerns raised by a user and/or for quality control purposed to check certain functions of the system.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What we claim is:

1. A method implemented by a computer system for exchanging documents for execution, the method comprising:
   receiving, by a workflow engine executed by a processor, routing information for a document via a secured website, the routing information comprising an originator of the document and a routing protocol for the document;
   automatically receiving, by the workflow engine, the document from the originator after receiving the routing information;
   routing, by the workflow engine, the document automatically based on the routing protocol for execution via at least one electronic signature, wherein routing the document comprises automatically providing access to a copy of the document and sending an electronic mail message to at least one recipient at a respective recipient address; and
   automatically tracking, by the workflow engine, the return of the executed document, wherein the executed document is received through the secured website.

2. The method of claim 1 wherein the secured website requires a password for access.

3. The method of claim 1, wherein the at least one recipient comprises a plurality of signatories and wherein the routing information comprises a respective identity of each of the plurality of signatories for the document and information relating to a source of the document for execution.

4. The method of claim 3, wherein the routing information further comprises respective contact information of each of the plurality of signatories.

5. The method of claim 1, wherein automatically receiving the document from the originator comprises transmitting a request for the document to the originator.

6. The method of claim 1, further comprising associating metadata with the document wherein the metadata comprises information identifying the document and the routing information.

7. The method of claim 1 wherein the electronic mail message is sent over the Internet.

8. The method of claim 1, further comprising providing access to the document by the at least one recipient via the secured website and wherein instructions are provided via the secured website for the return of the at least one electronic signature.

9. The method of claim 1, further comprising providing the document as an e-mail attachment to the at least one recipient.

10. The method of claim 1, further comprising receiving the at least one electronic signature from the at least one recipient through the secured website.

11. The method of claim 1, wherein the at least one electronic signature corresponds with an acknowledgement of approval.

12. The method of claim 1, wherein the routing information comprises a prompt to access to the document by the at least one recipient through the secured website and an association of metadata with the document.

13. The method of claim 1, wherein the at least one recipient comprises a plurality of signatories and further comprising:
   archiving the executed document after execution of the document by each of the plurality of signatories; and
   providing access via to the executed document as archived a network, wherein the access is provided to each of the plurality of signatories.

14. The method of claim 1 wherein the routing of the document comprises forwarding of the document to a plurality of signatories.

15. The method of claim 14, wherein one of the plurality of signatories is the originator.

16. The method of claim 14, wherein the routing information comprises an order of the plurality of signatories.

17. The method of claim 1, wherein the routing protocol identifies a format for routing the document and wherein routing the document automatically for at based on the routing protocol comprises:
   determining that the document received from the originator is in an additional format different from the format for routing the document; and
   converting the document to the format for routing the document.

18. The method of claim 1, wherein routing the document automatically for the at least one electronic signature further comprises:
   determining that the at least one recipient lacks access to at least one feature provided via the secured website to registered accounts for accessing the secured website; and
   providing an invitation with the document to register an account with the secured website.

19. A non-transitory computer-readable medium embodying program code executable by a processing device, the non-transitory computer-readable medium comprising:
   program code for receiving routing information for a document via a secured website, the routing information comprising an originator of the document and a routing protocol for the document;
   program code for automatically receiving the document from the originator after receiving the routing information;
   program code for routing the document automatically based on the routing protocol for execution via at least one electronic signature, wherein routing the document comprises automatically providing access to a copy of the document and sending an electronic mail message to at least one recipient at a respective recipient address; and
   program code for automatically tracking the return of the executed document, wherein the executed document is received through the secured website.

20. A system comprising:
   a processor configured to execute instructions stored in a non-transitory computer-readable medium;
   wherein the instructions comprise a workflow engine configured to perform operations comprising:
      receiving routing information for a document via a secured website, the routing information comprising an originator of the document and a routing protocol for the document;
      automatically receiving the document from the originator after receiving the routing information;
      routing the document automatically based on the routing protocol for execution via at least one electronic signature, wherein routing the document comprises automatically providing access to a copy of the document and sending an electronic mail message to at least one recipient at a respective recipient address; and
      automatically tracking the return of the executed document, wherein the executed document is received through the secured website.

* * * * *